(12) United States Patent
Malagnino (10) Patent No.: US 8,757,672 B2
(45) Date of Patent: Jun. 24, 2014

(54) PIPE FITTING WITH A SOLVENT CEMENT BARRIER

(75) Inventor: Giovanni Malagnino, Verdun (CA)

(73) Assignee: IPEX Technologies, Inc., Toronto, Ontario (CA)

( * ) Notice: Subject to any disclaimer, the term of this patent is extended or adjusted under 35 U.S.C. 154(b) by 334 days.

(21) Appl. No.: 12/543,985

(22) Filed: Aug. 19, 2009

(65) Prior Publication Data

US 2011/0042937 A1 Feb. 24, 2011

(51) Int. Cl.
*F16L 21/00* (2006.01)

(52) U.S. Cl.
USPC .......................................... 285/399; 285/915

(58) Field of Classification Search
USPC ............................ 285/399, 915, 238, 392, 331
See application file for complete search history.

(56) References Cited

U.S. PATENT DOCUMENTS

| | | | | |
|---|---|---|---|---|
| 2,103,838 | A * | 12/1937 | Bach | 285/238 |
| 2,825,587 | A * | 3/1958 | Barta et al. | 285/285.1 |
| 3,473,833 | A * | 10/1969 | Bremer | 285/285.1 |
| 3,482,859 | A * | 12/1969 | Bowlin | 285/332.3 |
| 3,649,055 | A * | 3/1972 | Nilsen | 285/197 |
| 3,686,747 | A * | 8/1972 | Bagnulo | 29/508 |
| 4,736,473 | A * | 4/1988 | Gellatly | 4/255.09 |
| 6,164,337 | A * | 12/2000 | Weise et al. | 138/44 |
| 6,540,261 | B1 | 4/2003 | Painter et al. | |
| 2006/0138773 | A1 * | 6/2006 | Feng et al. | 285/285.1 |
| 2007/0096467 | A1 | 5/2007 | Hikmat et al. | |

FOREIGN PATENT DOCUMENTS

FR 2611021 A1 * 8/1988 ............ F16L 13/11

OTHER PUBLICATIONS

Machine translation of FR 2,611,021.*
Spears FlameGuard™ CPVC Fire Sprinkler Products, FG-2-0700, Copyright 2000 (2 pages).

* cited by examiner

*Primary Examiner* — Aaron Dunwoody
(74) *Attorney, Agent, or Firm* — K&L Gates LLP (57) ABSTRACT

Various embodiments of a longitudinal fitting or other fluid conduit for a piping system are provided. The fitting can comprise a body including a first portion, a second portion, and a barrier between the first and second portions. The first portion can include a first inner surface that defines a first opening that is sized and configured to receive a first piping system component. In various embodiments, the barrier can be positioned between the first inner surface and a second inner surface of the second portion; the barrier can at least partially define a reservoir. When the first piping system component is secured to the fitting by a securing liquid, such as solvent cement, the barrier and/or reservoir can resist the liquid from reaching the second inner surface, thereby reducing the likelihood that the second inner surface will become damaged or otherwise compromised by chemically reacting with the securing liquid.

17 Claims, 6 Drawing Sheets

PIPE FITTING WITH A SOLVENT CEMENT BARRIER

BACKGROUND

The present disclosure generally relates to fittings for piping systems and more particularly to plastic fittings attached to plastic pipes via solvent cement.

Generally, piping systems are used in residential, commercial, and/or industrial buildings to carry water, natural gas, and/or any other fluid, liquid, and/or gaseous product. For example, piping systems may allow hot and cold water to be delivered to a faucet. Piping systems may also, for instance, be used as part of a fire sprinkler system to deliver water and/or fire suppressant to a room or other area.

Fittings for piping systems are often used to connect to one or more components in a piping system. Such fittings may also be known as couplings and/or adapters depending on the components joined by the fittings. Each end of a fitting may connect to a component via a variety of possible connections types. For example, a threaded connection may be used at one or more portions of the fitting. Further, a solvent cement, glue, and/or adhesive allows a fitting made from a plastic, such as polyvinyl chloride ("PVC"), chlorinated polyvinyl chloride ("CPVC"), and/or acrylonitrile butadiene styrene ("ABS"), to be attached and/or welded to a plastic pipe made from a similar material. The portion(s) of the fitting using a solvent cement connection are often smooth on the inside of the fitting to receive a similarly textured pipe. Further, the cement softens the plastic material it contacts to a gel-like state until the adhesive layer cures.

SUMMARY

In various embodiments, a fitting for use in a piping system is provided. In at least one embodiment, the fitting includes a body comprising a first portion and a second portion and a barrier positioned between the first portion and the second portion. In these embodiments, the first portion includes a first surface that defines a first opening that is sized and configured to receive a first piping system component that is secured to the first portion by a securing liquid. Further, in these embodiments, a barrier is positioned between the first portion and the second portion. In these embodiments, the barrier includes a surface that at least partially defines a reservoir. The reservoir is configured to collect at least some of the securing liquid.

In various embodiments, a fluid conduit is provided that can comprise a body including at least one interior surface and at least one exterior surface, a passageway for a fluid that is defined by the at least one interior surface, and a lip extending into the passageway. In these embodiments, at least a portion of the lip is configured to capture a liquid when the liquid is added to a portion of the at least one interior surface.

In various embodiments, a pipe fitting is provided that can comprise a body defining a passageway between a first opening and a second opening. In these embodiments, the first opening is sized and configured to receive a first piping system component and the second opening is sized and configured to receive a second piping system component. Further, a liquid holding means is used to hold a liquid, with the liquid holding means being positioned between the first opening and the second opening.

This summary is intended to briefly outline certain embodiments of the subject application. It should be understood that the subject application is not limited to the embodiments disclosed in this summary, and is intended to cover modifications that are within its spirit and scope, as defined by the claims.

BRIEF DESCRIPTION OF THE FIGURES

The novel features of the various embodiments are set forth with particularity in the appended claims. The various embodiments, however, both as to organization and methods of operation, may best be understood by way of example with reference to the following description, taken in conjunction with the accompanying drawings as follows.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present application is defined solely by the claims. The features illustrated or described in connection with one exemplary embodiment may be combined with the features of other embodiments. Such modifications and variations are intended to be included within the scope of the present application.

Before explaining the various embodiments in detail, it should be noted that the embodiments are not limited in their application or use to the details of construction and arrangement of parts illustrated in the accompanying drawings and description. The illustrative embodiments may be implemented or incorporated in other embodiments, variations, and modifications, and may be practiced or carried out in various ways. The following description, in conjunction with the accompanying drawings, are intended to convey all such modifications and variations.

In the following description, like reference characters designate like or corresponding parts throughout the several views. Also in the following description, it is to be understood that such terms as "forward," "rearward," "front," "back," "right," "left," "upwardly,""downwardly," and the like are words of convenience and are not to be construed as limiting terms. The description below is for the purpose of describing various embodiments and is not intended to limit the subject application thereto.

The various embodiments described herein are directed to piping systems and more particularly to fittings for piping systems. An exemplary, but non-limiting, fitting is described in U.S. Patent Application Publication No. 2007/0096467 to Hikmat et al., titled "Reinforcing Ring for a Plastic Fitting and Plastic Fitting Incorporating a Reinforcing Ring," hereby incorporated by reference in its entirety. Further, the various embodiments of the present application provide fittings useful in various piping systems. For example, in various embodiments, a fitting may include a barrier feature that prevents or inhibits solvent cement added to one portion of the fitting from reaching another portion of the fitting. In such embodiments, the fitting may be made from plastic, such as, but not limited to, PVC, CPVC, and/or ABS, and the solvent cement may be PVC, CPVC, ABS, and/or all purpose plastic solvent cement, for example. These and other embodiments are now illustrated and described with reference to the following figures.

Figure 1:
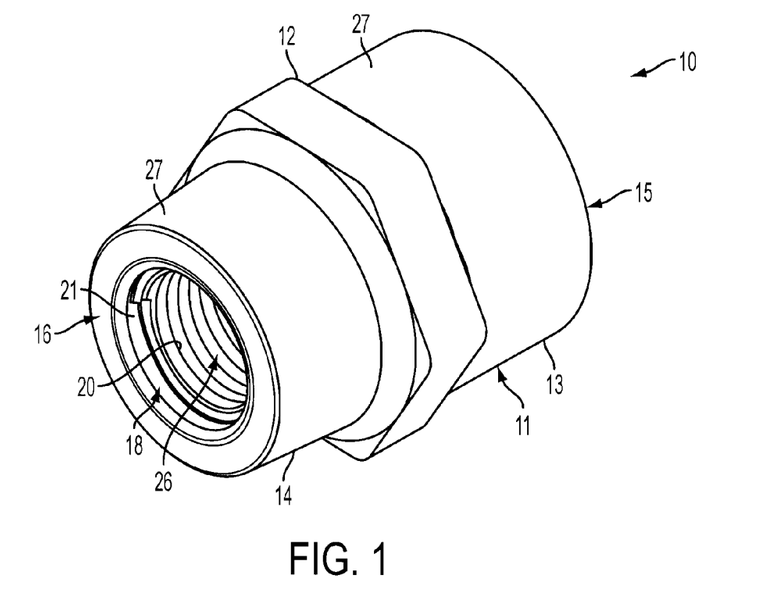
FIG. 1 is a front perspective view of a non-limiting embodiment of a pipe fitting.
Figure 2:
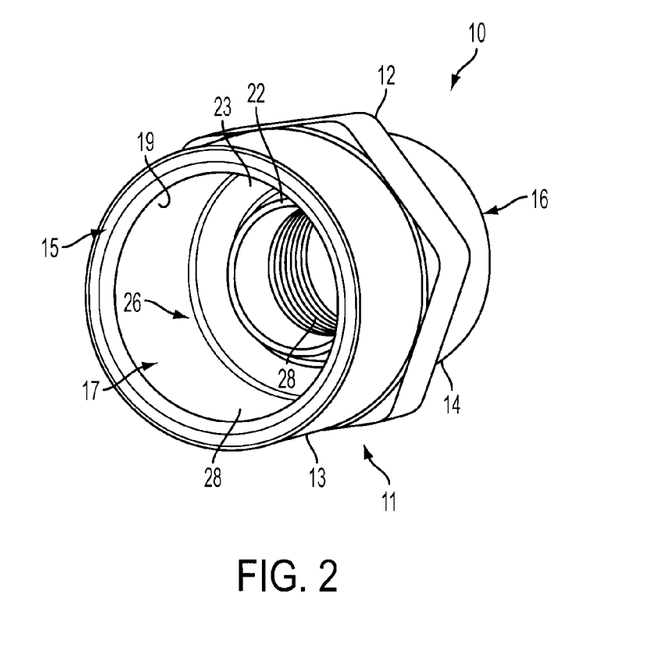
FIG. 2 is a back perspective view of the fitting of FIG. 1.

Focusing now on at least one embodiment, a fitting for a piping system is provided for connection to at least one piping system component. In various embodiments, the fitting may couple at least two piping system components together. Such components may include, but are not limited to, pipes, nozzles, valves, hoses, flexible tubing, and the like. Referring now to FIGS. 1-2, a fitting 10 may include a body 11 comprising a first portion 13 and a second portion 14. The first portion 13 may be adapted to connect to a first piping system component (not shown) and the second portion may be adapted to connect to a second piping system component (not shown). The body 11 may include an interior surface or set of interior surfaces 28 and an exterior surface or set of exterior surfaces 27, the interior surfaces 28 of which may define a passageway 26 through the fitting 10 to allow a fluid, i.e. a liquid and/or a gas, to pass between the first component and the second component, and/or between a first end 15 of body 11 and a second end 16 of body 11. The interior surfaces 28 may include first inner surface 19 and second inner surface 20, described below.

In various embodiments, referring still to FIGS. 1-2, the first portion 13 of body 11 may connect to a pipe, for example. The second portion 14 of body 11 may connect to a threaded piping system component, such as a nozzle, valve, and/or threaded hose. Accordingly, fitting 10 may allow a pipe to be coupled to a threaded component. While the illustrated fitting 10 has two connection portions 13 and 14, a fitting, according to various other embodiments, may include only one connecting portion or more than two such portions. Referring back to the embodiment of FIGS. 1-2, the first portion 13 may include a first inner surface 19 that is smooth in texture and defines a first opening 17 that is sized and configured to receive a similarly textured pipe, see, e.g. pipe 50 illustrated in FIG. 5. Further, the second portion 14 may include a second inner surface 20 that includes threads 20a formed therein, see, e.g., FIG. 4, for threadingly engaging a threaded component (not shown). Second inner surface 20 also defines a second opening 18 that is likewise sized and configured to receive the threaded component. Accordingly, the two openings 17, 18 are connected to each other via passageway 26. Further, the second portion 14 may also include a metallic reinforcing ring 21 that includes a starter thread which is integrally formed with a guide portion that may guide a male part to be axially in line with second portion 14. Such a reinforcing ring 21 is described in further detail in U.S. Patent Application Publication No. 2007/0096467 to Hikmat et al., titled "Reinforcing Ring for a Plastic Fitting and Plastic Fitting Incorporating a Reinforcing Ring," mentioned above and incorporated by reference herein in its entirety. In use, a user may hold fitting 10 with a tool, a wrench, for example, about a collar 12 formed on the exterior of body 11.

Figure 7:
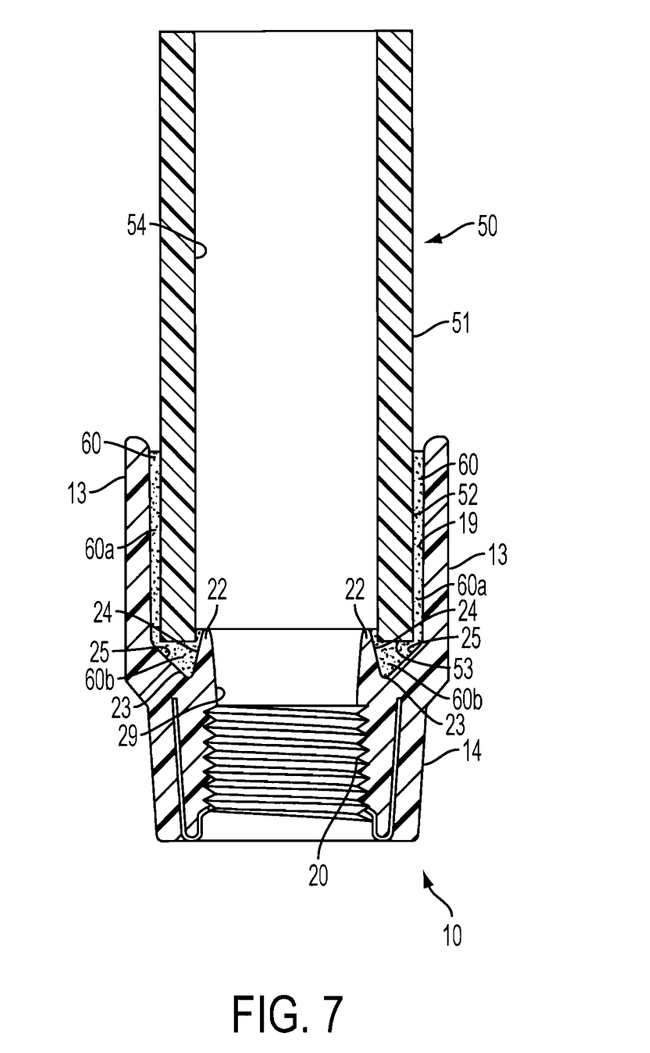
FIG. 7 is a cross-sectional view of the pipe inserted into the fitting of FIG. 5, taken along line A-A shown in FIG. 3; both the pipe and the fitting are shown in cross-section.
Figure 8:
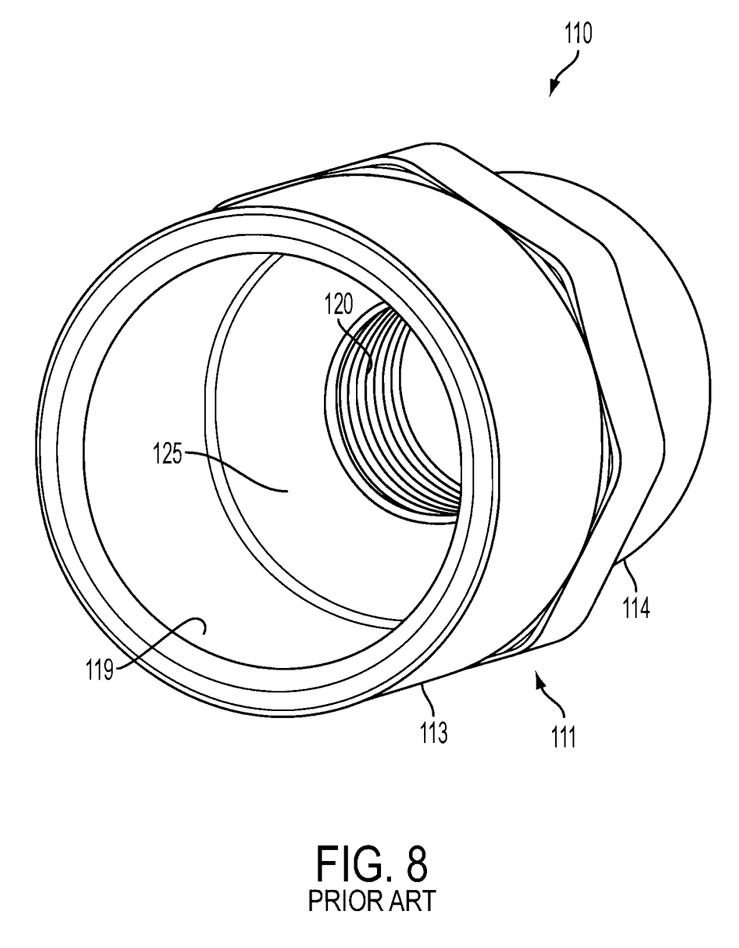
FIG. 8 is a back perspective view of a prior art fitting.

In various embodiments, referring now to FIG. 7, in use, a pipe 50, or other appropriate piping system component may be added to a portion of fitting 10, at first portion 13, for example. The pipe 50 may comprise a body 51 having an interior surface 54 and an exterior surface 52. The pipe 50 and/or fitting 10 may be each at least partially made of a plastic, such as PVC, CPVC, and/or ABS, for example. In such embodiments, the pipe 50 may be welded, adhered, and/or otherwise fixedly attached to first portion 13 of fitting 11 by applying an appropriate securing liquid or solvent cement, such as PVC, CPVC, ABS, and/or all-purpose plastic solvent cement, between the components. For example, before placing pipe 50 into fitting 10, solvent cement 60 may be added to a portion of the exterior surface 52 of pipe 50, near pipe end 53. Further, in various embodiments, solvent cement may alternatively, or additionally, be added to first inner surface 19 of the fitting's first portion 13. After the solvent has been applied to the pipe 50 and/or to the fitting 10, the end 53 of pipe 50 may be inserted into first portion 13 of fitting 10 through first opening 17 (see FIG. 4). Thereafter, the fitting 10 and the pipe 50 may bond together due to a chemical reaction caused by the solvent cement 60 on the plastic material of the pipe 50 and/or fitting 10. Further, the solvent cement 60 may cause at least a portion of the material that it touches to enter a gel-like state until the solvent cement 60, the material of fitting 10, and/or the material of pipe 50 cures, thereby welding, adhering, cementing, and/or otherwise fixedly connecting the pipe 50 to the fitting 10.

Referring still to FIG. 7, while the solvent cement 60 is desirable to bond the non-threaded portion of the fitting 10, e.g. first portion 13, to the pipe 50, it may be undesirable to have solvent cement 60 cast on or otherwise contact threads 20a of the second portion 14. Because threads 20a may be made of a plastic also, the solvent cement 60 could cause issues if the material of the threads 20a were to chemically react with the solvent cement 60. For example, in such situations, the threads 20a may become damaged, disfigured, and/or otherwise defective, if solvent cement 60 touches them. Damage to threads 20a may make connection of the fitting to a threaded component impossible, lead to leaks from the fitting 10, and/or create other problematic issues. The likelihood of such thread damage from the solvent cement 60 may occur when excess or surplus cement 60 is forced out from the first portion 13 of fitting 10. Further, the probability of thread damage is also increased when the second portion 14 is facing downward, such that gravity may assist in causing some of cement 60 to flow onto threads 20a.

Figure 3:
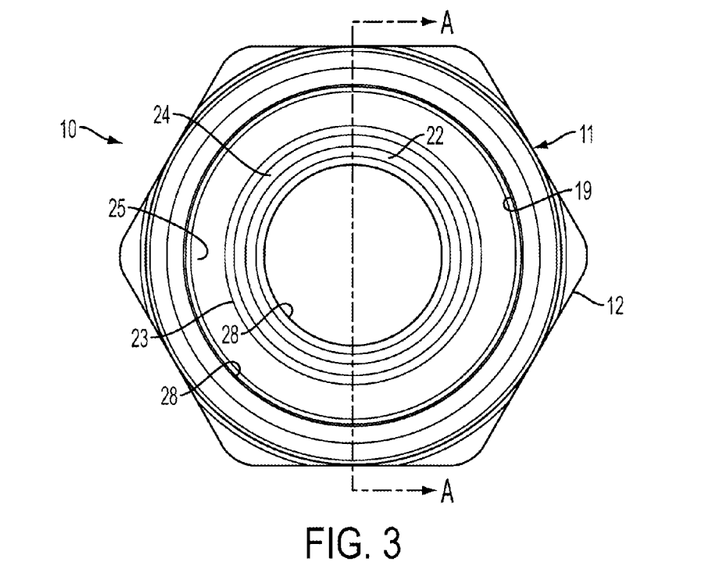
FIG. 3 is a top view of the fitting of FIG. 1.
Figure 4:
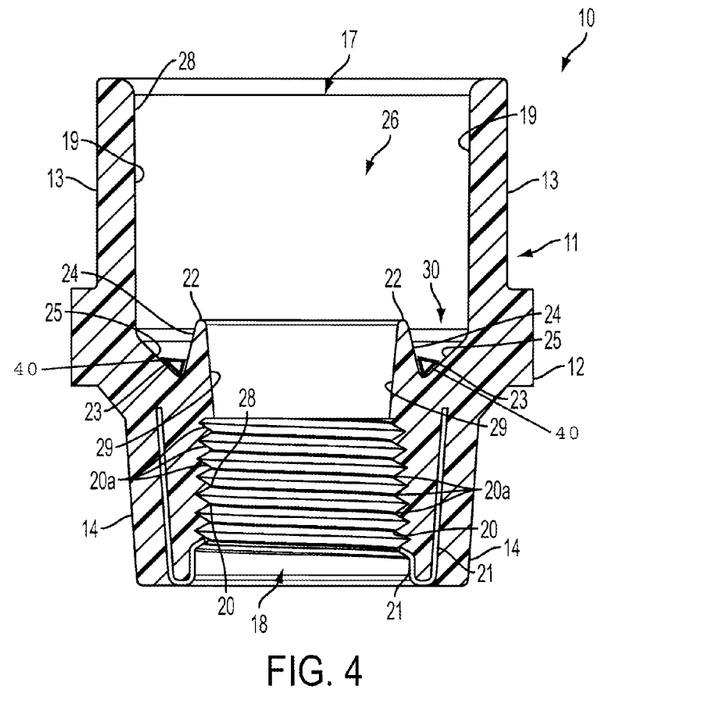
FIG. 4 is a cross-sectional view of the fitting of FIG. 1, taken along line A-A of FIG. 3.
Figure 5:
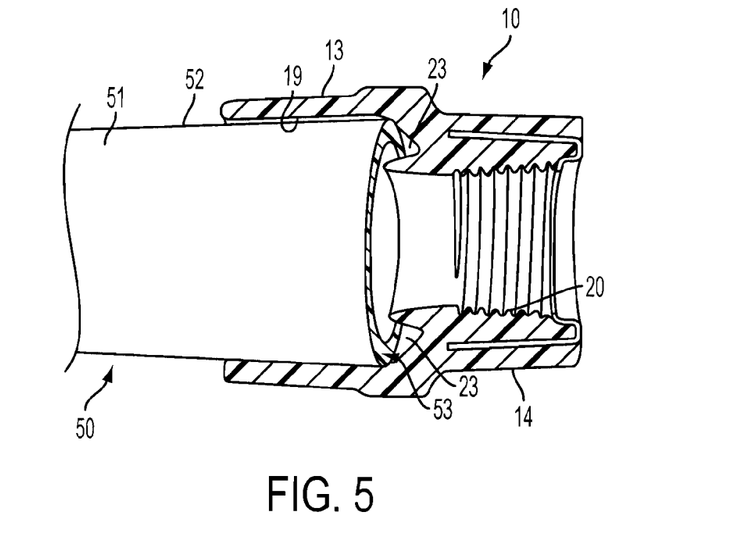
FIG. 5 is a side perspective view of a pipe inserted into one opening of the fitting of FIG. 1; for clarity, the fitting is shown in cross-section, taken along line A-A shown in FIG. 3.
Figure 6:
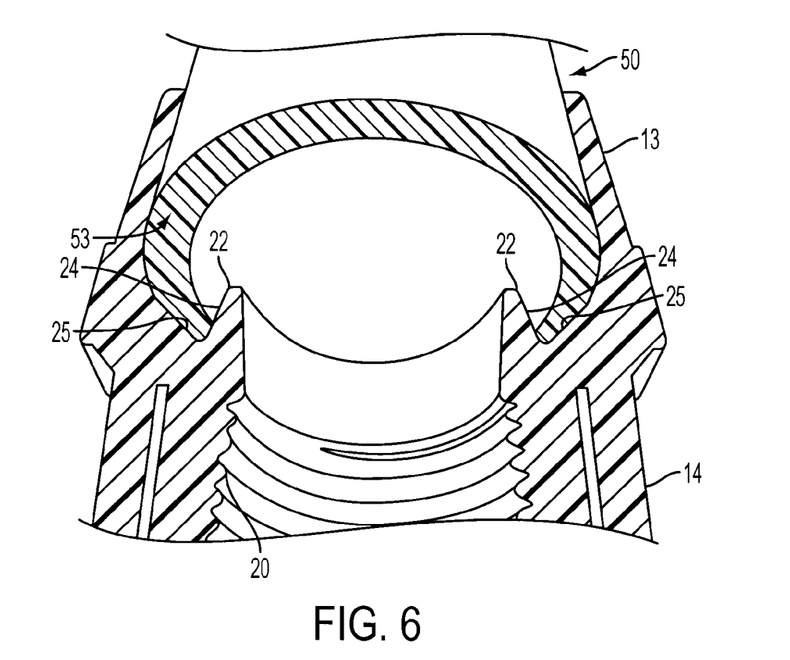
FIG. 6 is a front perspective view of the pipe inserted into the fitting of FIG. 5.

Referring now to FIGS. 3-4, to prevent, resist, reduce, or otherwise ameliorate such destructive contact of the solvent cement 60 on second portion 14 and/or threads 20a, a barrier lip 22 may be provided between first opening 17 and second opening 18 and/or between first portion 13 and second portion 14. At least a portion of barrier lip 22 is configured to create a liquid reservoir 23 which may be defined by a first reservoir surface 24 and a second reservoir surface 25. Accordingly, the reservoir 23 is positioned between and may divide the first portion 13 from the second portion 14 and/or the first inner surface 19 from the second inner surface 20 of the fitting 10. The second reservoir surface 25 may be adjacent to first inner surface 19 of the fitting 10 and the first reservoir surface 24 may form a portion of barrier lip 22. First reservoir surface 24 may further be adjacent to the second reservoir surface 25 and angled such as to form a V-shaped reservoir (as viewed in the cross-sectional illustrations of FIGS. 4 and 7, for example) or trough having an open side 30 that faces or is directed towards the first opening 17 and/or is oriented towards the first inner surface 19. Further, the barrier lip 22 may protrude partially into passageway 26, or the interior space of fitting 10, such that the barrier lip 22 and/or first reservoir surface 24 of barrier lip 22 is configured to at least partially collect, capture, and/or hold a liquid, such as surplus solvent cement 60b, for example, when solvent cement 60a is applied to and flows along the first inner surface 19 of fitting 10 toward reservoir 23, see, e.g., FIG. 7. Referring to FIG. 7, while the barrier lip 22 may hold excess solvent cement 60b, it ultimately also permits fluid flowing through the pipe 50 to pass from first portion 13 to second portion 14 of the fitting 10 over, along, and/or adjacent to back barrier surface 29 because the barrier lip 22 is sized and configured such that it does not completely occlude the passageway 26.

Figure 9:
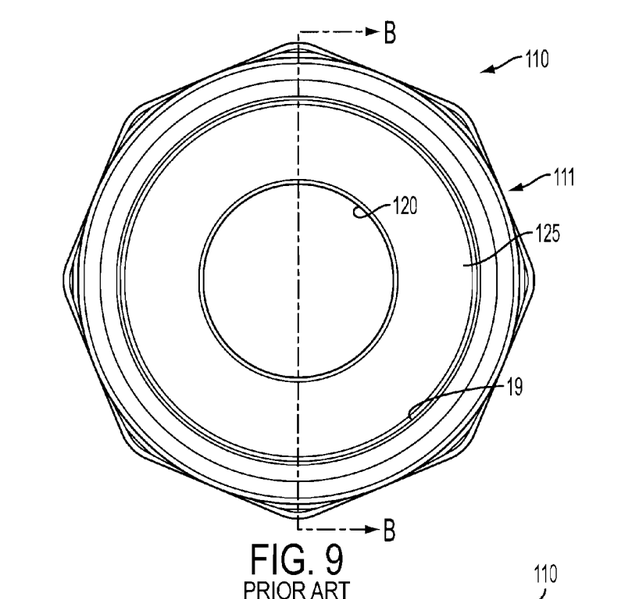
FIG. 9 is a top view of the fitting of FIG. 8.
Figure 10:
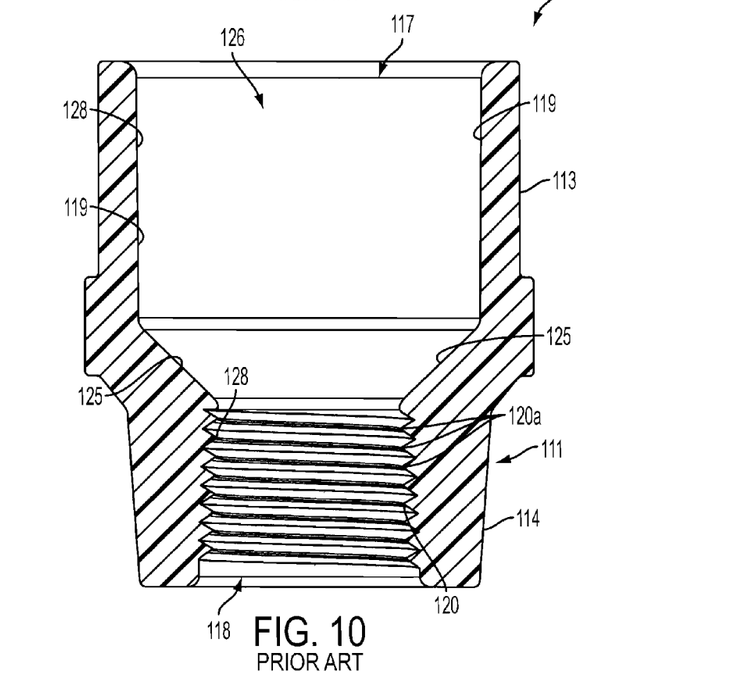
FIG. 10 is a cross-sectional view of the fitting of FIG. 8, taken along line B-B of FIG. 9.

The various advantages of including a barrier feature, such as barrier lip 22 and/or reservoir 23, in fitting 10 are notably apparent when one examines the differences between a previous fitting that does not include such a barrier. For example, referring now to FIGS. 9-10, a prior art fitting 110 is illustrated. Any liquid, such as a cement solvent, applied to first inner surface 119, may readily flow along surface 119 to angled surface 125 and ultimately to threads 120a of second inner surface 120. Accordingly, damage to surface 120, in the form of thread damage, for example, may occur. The above described fitting 10, illustrated in FIGS. 1-7, resists such damage at least in part due to a barrier feature, such as barrier lip 22 and/or reservoir 23.

Referring back to FIGS. 2-3, in the illustrated embodiments, the fitting 10 is generally cylindrical in shape. In such embodiments, the barrier lip 22 may be circular and also of generally cylindrical or annular shape. However, other embodiments are possible where the fitting is rectangular, polygonal, or of another geometric shape. In such embodiments, the barrier lip may also be of a complimentary shape to that of the fitting.

Further, referring now to FIG. 4, while second portion 14 includes threads 20a along a portion of second inner surface 20, all of surface 20 may also be smooth, textured, and/or otherwise non-threaded. Regardless, in such embodiments, barrier lip 22 may still provide a benefit where it is undesirable to have solvent cement contact a portion of second inner surface 20.

The above discussed embodiments have discussed including a barrier lip for the purposes of creating a liquid reservoir. In various embodiments, other liquid barriers are envisioned, where such liquid barriers hold liquid and prevent or resist liquid from flowing from along one wall of a fitting to another. For example, referring to FIG. 4, in place of or in addition to a barrier lip, a sponge or other absorbent material 40 may be placed between portions of the fitting. In at least one embodiment, such absorbent material 40 may be placed in the liquid reservoir 23 described above. Additionally, a liquid barrier could include a rubber gasket that may be placed between portions of the fitting. Further, a liquid barrier, in various embodiments, could be removable. For example, a liquid barrier could include a thin plastic film that may be added to the fitting after the part is molded, or a liquid barrier could include a molded knock-out screen, either or both of which may be removable after the liquid and/or solvent cement dries.

Also, while the above has illustrated a fitting or coupling having two female portions, the fitting could also include one male portion and one female portion, or two male portions. In embodiments where more than two coupling portions are present in the fitting, any possible combination of male and female receptacles are possible. Additionally, in embodiments including a male portion for insertion into a pipe, the liquid barrier, e.g., a barrier lip, could be positioned on the exterior of the fitting instead of the interior as illustrated in FIGS. 1-7. Further, while various embodiments have described a fitting for a piping system, any other component of a piping system that uses solvent cement to attach to another component of such a system could include a solvent cement or liquid barrier feature as described herein. For example, where two pipes or other fluid conduits are directly connected to each other, one or both could include a solvent cement barrier on its interior and/or exterior surface. In any event, the liquid barrier serves to resist liquid applied to one surface of the fitting and/or component from flowing, dripping, and/or casting onto another surface of the fitting and/or component, where the presence of such liquid could be undesirable.

Although various embodiments have been described herein, many modifications and variations to those embodiments may be implemented. In addition, combinations of the described embodiments may be used. Also, where materials are disclosed for certain components, other materials may be used. The foregoing description and following claims are intended to convey and cover all such modification and variations.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:
1. A piping system comprising:
 a first piping system component, wherein the first piping system component comprises a longitudinal portion that terminates at a distal end; and
 a fitting comprising:
  a body comprising a first portion and a second portion, wherein the second portion comprises internal threads, wherein the first portion includes a first interior surface that defines a first opening through the body, wherein the first opening is sized so that the first piping system component is positioned in the first opening, wherein the longitudinal portion is securable to the first interior surface of the first portion by a securing liquid therebetween, wherein the second portion includes a second surface that defines a second opening, and wherein the body defines a sealed passageway between the first opening and the second opening; and
  a barrier positioned between the first interior surface of the first portion and the internal threads of the second portion, wherein the barrier includes a surface that at least partially defines a reservoir for receiving the distal end of the first piping system component and to collect at least some of the securing liquid, and wherein the distal end of the first piping system component and at least some of the securing liquid are positioned in the reservoir.

2. The piping system of claim 1, further comprising a second piping system component, wherein the second opening is sized and configured to receive the second piping system component.

3. The piping system of claim 2, wherein the second surface of the body is a second inner surface and wherein the barrier is positioned between the first interior surface and the second inner surface.

4. The piping system of claim 3, wherein the reservoir includes an open side, and wherein the open side faces the first opening.

5. The piping system of claim 1, wherein the body comprises a plastic.

6. The piping system of claim 5, wherein the body comprises polyvinyl chloride (PVC), chlorinated polyvinyl chloride (CPVC), or acrylonitrile butadiene styrene (ABS).

7. The piping system of claim 1, wherein the body further comprises a plurality of portions, wherein each portion includes a surface that defines an opening that is sized and configured to receive a piping system component.

8. A conduit assembly, comprising:
a first longitudinal component, wherein the first longitudinal component terminates at a distal end; and
a fluid conduit comprising:
an inlet;
an outlet;
a body including a non-threaded interior surface, a threaded interior surface, and at least one exterior surface;
a passageway extending uninterrupted between the inlet and the outlet and defined by at least the non-threaded interior surface and the threaded interior surface, wherein the first longitudinal component fits within the passageway, and wherein the first longitudinal component is securable to the non-threaded interior surface of the body by a securing fluid; and
a lip extending into the passageway between the non-threaded interior surface and the threaded interior surface, wherein at least a portion of the lip fits within the distal end of the first longitudinal component and wherein the lip captures at least some of the securing fluid when the securing fluid is added to a portion of the non-threaded interior surface.

9. The conduit assembly of claim 8, wherein the lip includes a surface that at least partially defines a reservoir including an open side, wherein the open side is oriented towards the non-threaded interior surface, and wherein the reservoir is configured to receive the distal end of the first longitudinal component of the piping system.

10. The conduit assembly of claim 8, wherein the passageway connects at least two openings.

11. The conduit assembly of claim 8, wherein the body comprises a plastic.

12. A system comprising:
a first component comprising a longitudinal surface that terminates at a distal end;
a second component; and
a fitting comprising:
a body defining:
a first receiving means for receiving the first component;
a second receiving means for receiving the second component, wherein the second receiving means comprises an internally threaded portion; and
a longitudinal passageway extending between the first receiving means and the second receiving means, wherein the longitudinal passageway forms a continuous fluid boundary intermediate the first receiving means and the second receiving means, wherein the longitudinal surface of the first component is securable to the longitudinal passageway of the body; and
liquid holding means for holding the distal end of the first piping system component and for holding a liquid, wherein the liquid holding means is positioned between the first receiving means and the internally threaded portion of the second receiving means.

13. The system of claim 12, wherein the liquid holding means comprises a lip protruding into the longitudinal passageway.

14. The system of claim 12, wherein the liquid holding means comprises an absorbent material.

15. The system of claim 12, wherein the liquid holding means comprises a set of surfaces defining a reservoir.

16. The system of claim 15, wherein the reservoir includes an open side, and wherein the open side is directed towards the first opening.

17. The system of claim 12, wherein the liquid holding means is removable.

* * * * *